Feb. 18, 1930.  T. J. KLEIN  1,747,476
BIRD PERCH
Filed May 29, 1929
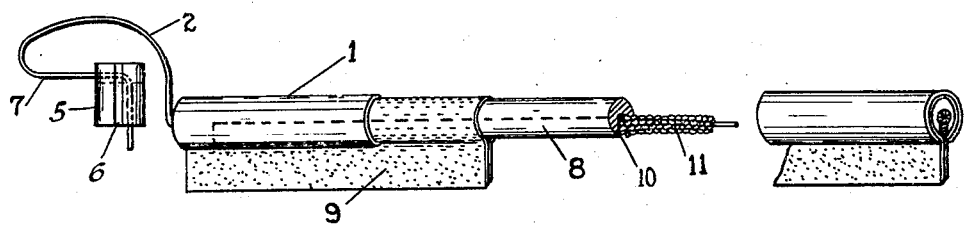
Fig. 1.
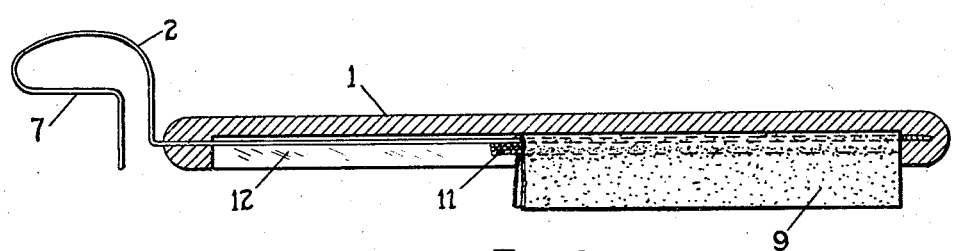
Fig. 2.
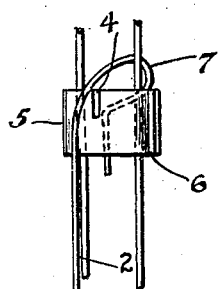
Fig. 3.
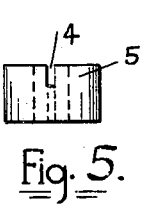
Fig. 4.
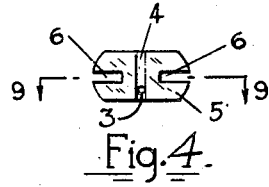
Fig. 5.   Fig. 6.   Fig. 7.
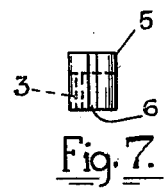
INVENTOR
THOMAS J. KLEIN.
BY
ATTORNEY Patented Feb. 18, 1930

1,747,476

UNITED STATES PATENT OFFICE

THOMAS J. KLEIN, OF CHICAGO, ILLINOIS

BIRD PERCH

Application filed May 29, 1929. Serial No. 366,809.

This invention relates to the housing of birds that are kept in households such as canaries and the smaller species.

An object of the present invention is the provision of perches that are not only ornamental, but sanitary and healthful, not only to the bird itself, but all members of a household in general, where birds are kept.

My invention also relates to a perch that can be made of wood, metal, cork, bakelite, pyralin and many other materials, but I prefer to use celluloid because it contains from 25 to 35% camphor, which makes it verminproof and sanitary. The highly polished surface of celluloid prevents droppings from sticking to the perches, thereby eliminating the washing or cleaning of perches. Also because various colors can be used to conform with various color schemes of different cages, thereby adding beauty to the cage. These colors are fast in celluloid and will not run or rub off. Also celluloid is water-proof and will not absorb dampness, leaving the perches dry and clean, which prevents rheumatism and many other foot diseases for the bird.

My invention functions not only as a perch to support a bird in captivity but forces the bird to keep its claws and nails in perfect condition, and also compels the bird to exercise every muscle in its body, rivalling the elements of nature which the birds are deprived of.

In carrying out the object of the invention, I propose to shape the perch in such a way that the bird is required to constantly claw a piece of emery or sandpaper that is so adjusted that only the tips of the nails are forced to grind to the proper length, without scraping the feet and thereby preventing infection. The sand paper or emery, can be easily replaced at will.

The different perches on the market purporting to keep the claws in good condition, are round in circumference and are stationary whereby a bird's claws completely encircle the perch and the nails continue to grow in length, because, there is nothing to stop the nails or claws from growing.

Heretofore, all spring perches related only to the center or long perch. Food and water perches are the important ones, because they are the ones that constantly get the jar and strain when a bird jumps or half-flys hundreds of times a day from the center perch to the water and food perch. This is what causes corns, callouses, and bunions and many other ailments affecting the whole anatomy.

My invention provides a wire spring fastened to the center as well as to the food and water perches, and attached to a celluloid socket holding the perches at any angle or position desired. These sockets are made to fit any cage.

Therefore, I provide a set of three perches, all operating on springs and constructed practically the same, in every detail, the only difference is the food perches are equipped with longer wire which drops down to the proper length. All three perches can be removed from the outside of the cage.

All bird cages, especially during the summer months, give off an ill smelling odor, which I propose to eliminate. In order to do so I have provided in my invention a deodorizer and delouser which will keep the cage free from vermin and germs, and give off a fresh clean odor which will emanate from the cage. This delouser and deodorizer which absorbs a liquid preparation consists of a strip of wool, or other materials, which can be removed and replaced at will.

With these and other objects in view, reference is made to the accompanying sheet of drawings which illustrate a preferred form of my invention, with the understanding that minor details may be changed without departing from the scope thereof.

In the drawings:

Figure 1, is an enlarged perspective detail view, with parts broken away and with parts in section, of one form of this invention.

Figure 2, is an enlarged detail view, partly in central vertical section with parts broken away and inside elevation, of another form of this invention.

Figure 3, is a view similar to Figure 1, of another form of this invention, as applied to a food and water perch illustrating the perch holder as applied to a bird cage.

Figure 4, is a top plan view, Figure 5, a front elevation view and Figure 7, an end elevation view, respectively, of the perch holder and Figure 6, is a view in section of the same taken on the line 9—9, Figure 4.

In carrying out this invention the perch body 1 is supported by a resilient wire member 2, preferably attached longitudinally thereto, bent back upon itself and then downward to engage in a vertical recess 3 provided therefor in a transverse slit 4 upon the upper side of a perch holder 5, as shown in Figures 3 to 7, respectively. The perch holder 5 is also provided with vertical slots 6 at each end and is of such width as to be placed between adjacent vertical wires of a bird cage, with the said wires being received in said vertical slits and manually bent toward each other under the holder to support it in the position desired. By bending the resilient member 2 back upon itself a double portion 7 is provided extending beyond the exterior of the cage which is adapted to be grasped by the hand to insert the perch to position it within the cage and engage the extremity of the member 2 in the perch holder 5 and likewise lift the perch from the holder 5 for removal from the cage.

This invention contemplates supporting not only the long upper perches in the manner above described but also the shorter food and water perches in the same manner by increasing the length of the resilient member 2 between its engagement with the perch body and the bent back portion 7, as shown in Figure 3. The resilient member 2 is attached to one end of the perch body 1, so that whenever the bird hops or flies from one perch to the other or from the bottom of the cage to a perch, the perch upon which it lights gives, causing the bird not only to exercise its muscles to maintain its balance but to also grip the perch with its claws. This gripping and balancing movement of the bird upon the vibrating perch is employed in this invention to cause the bird to automatically trim its own toe nails.

In accordance with this invention, the perch body 1, is provided with a longitudinal strip of abrasive material depending from the underside thereof so that when the bird's claws grasp the perch the end of the nails will engage the roughened surface, as shown in Figure 3, and the movement of the bird will cause a trimming or wearing down of the ends of its toe nails to the proper length and the constant hopping of the bird from perch to perch will constantly cause the ends of the nails to engage the abrasive strip on each perch and automatically maintain its toe nails the proper length.

One embodiment of the perch body as contemplated by this invention is illustrated in Figure 1. In this form the end of the resilient wire 2 is secured in one end of a cylindrical wood core 8. A strip of abrasive material 9, such as fine sand paper or emery cloth, preferably the length of the perch and of sufficient width to be wrapped about the perch with the edges brought together on the under side and depend therebelow, is placed about the core and an outer covering or shell, preferably of celluloid, in the form of a split sleeve is then placed about the core 8 and material 9, with the depending portion passing through the slit in the sleeve as shown in detail in Figure 1. In this form the under side of the core is cut out to provide a longitudinal recess 10 adapted to receive therein, either before or after the perch has been assembled, a piece of wool or other absorbing material 11, shown in this instance as a plurality of woolen strands secured upon a wire, such as the pipe stem cleaner of commerce. The recess 10 being open at the free end of the perch will afford access to the enclosed woolen material. Most birds when purchased have lice or vermin and these insects will leave the bird and inhabit the woolen material within the perch. This woolen material is also adapted to absorb a deodorant and, if desired, may be dipped in a deodorizing solution before being placed within the core. The outer sleeve is preferably of celluloid for the reasons heretofore given.

From the above description, it is seen that a perch constructed as shown in Figure 1, is not only readily placed within but removed from the cage and is capable of quickly being dissembled for replacing the abrasive or deodorizing material and reassembled.

Figure 2 illustrates another form in which the body portion 1 is made in one piece of material, preferably celluloid, and is provided with an undercut recess 12 extending upward beyond the longitudinal center, and the supporting wire 2 is extended along this center line and screwed into the solid end, as shown. In this form the strip of abrasive material 9 is folded longitudinally, the absorbing material 11 placed within the fold and the folded edge inserted in the recess 12 with the wire removed, then the wire is inserted and secured in the solid end.

The food or water perch illustrated in Figure 3 is similar in construction to the long perch shown in Figure 1 except the recess 10 in the core 8 is omitted and in this case the woolen absorbing material 11 is placed against the core 8 between the adjacent folds of the abrasive material 9 after it has been wrapped about the core 8 and then the outer split sleeve is slipped over the free end.

What I claim is:

1. A perch for a bird cage having a smooth surface and provided with a longitudinal depending strip of arbrasive material adapted to be contacted by the toe nails of a bird's claws when grasping the perch.

2. A perch for a bird cage having an outer surface of smooth celluloid and longitudinal central depending strip of abrasive material adapted to be contacted by the nails of the claws of a bird to maintain its balance upon the perch.

3. A perch for a bird cage including a smooth cylindrical perch, means for resiliently supporting one end of the perch, and means including a depending longitudinal abutment for contacting and automatically trimming the toe nails of a bird when it alights upon the perch and intermittently grasps the smooth surface thereof to maintain its balance as the perch vibrates.

4. A perch for a bird cage having a smooth surface, means for supporting a longitudinal depending strip of abrasive material from the underside thereof, and an absorbing material adapted to attract vermin and temporarily retain and give out a deodorizer.

5. A perch for the feed and water containers of a bird cage having a resilient support secured at one end thereof, extending upwardly therefrom and adapted to be engaged at its free end with the cage, said perch having a longitudinal strip of abrasive material depending therefrom adapted to be contacted by the toe nails of the bird alighting upon the perch to feed during the intermittent grasping of the perch by the claws of the bird as it maintains its balance during the vibration of the perch resulting from its impact in alighting thereon.

THOMAS J. KLEIN.